United States Patent [19]
Abdel-Kader

[11] Patent Number: 5,460,679
[45] Date of Patent: Oct. 24, 1995

[54] METHOD FOR PRODUCING THREE-DIMENSIONAL EFFECT

[75] Inventor: Alain Abdel-Kader, Bedford, Tex.

[73] Assignee: Triad Technologies International, Inc., Irving, Tex.

[21] Appl. No.: 190,916

[22] Filed: Feb. 3, 1994

[51] Int. Cl.⁶ .................................................. B32B 31/00
[52] U.S. Cl. ................... 156/275.5; 156/286; 156/302; 156/277; 427/510; 427/369; 427/164; 427/282; 427/272; 427/277; 430/321
[58] Field of Search ................. 156/275.5, 302, 156/286, 277; 427/510, 369, 164, 282, 272, 277, 164; 430/321

[56] References Cited

U.S. PATENT DOCUMENTS

| | | |
|---|---|---|
| 3,462,226 | 8/1969 | Huffaker . |
| 3,508,920 | 4/1970 | Glenn, Jr. . |
| 3,560,296 | 2/1971 | Anderson . |
| 3,582,961 | 6/1971 | Shindo . |
| 3,734,618 | 5/1973 | Dudley . |
| 3,834,348 | 9/1974 | Black . |
| 4,414,316 | 11/1983 | Conley . |
| 4,478,639 | 10/1984 | Smith et al. . |
| 4,600,297 | 7/1986 | Winnek . |
| 4,677,285 | 6/1987 | Taniguchi . |
| 4,807,024 | 2/1989 | McLaurin et al. . |
| 4,834,476 | 5/1989 | Benton . |
| 4,930,413 | 6/1990 | Jaffa . |
| 4,935,335 | 6/1990 | Fotland . |
| 4,983,246 | 1/1991 | Bunting . |
| 4,997,687 | 3/1991 | Carter . |
| 5,108,531 | 4/1992 | Quadracci . |
| 5,134,504 | 7/1992 | Smith et al. . |
| 5,174,204 | 12/1992 | Meier et al. . |
| 5,281,301 | 1/1994 | Basavanhally . |
| 5,330,799 | 7/1994 | Sandor et al. . |

FOREIGN PATENT DOCUMENTS

| | | |
|---|---|---|
| 2478335 | 9/1981 | France . |
| 2551559 | 3/1985 | France . |
| 2551560 | 3/1985 | France . |

*Primary Examiner*—Chester T. Barry
*Attorney, Agent, or Firm*—Cooper & Dunham

[57] ABSTRACT

A method of producing a depth enhanced printed product uses a screen printer. An optic screen of finely spaced lines are formed as a cured emulsion on a mesh silk-screen. A clear gel is extruded through the mesh screen onto the front side of a clear plastic sheet, creating an array of lenses. An image is previously printed on the back side of the plastic sheet using an offset printer. An optic grid of lines are superimposed in the image. The optic grid has a relationship with the lenses to create special effects such as depth enhancement.

20 Claims, 3 Drawing Sheets

METHOD FOR PRODUCING THREE-DIMENSIONAL EFFECT

BACKGROUND OF THE INVENTION

1. Field of the Invention

This invention relates in general to printing processes, and in particular to a method for producing a print which has a three-dimensional effect.

2. Description of the Prior Art

Prints which have a three-dimensional appearance have many uses, such as for posters, magazine covers and inserts, sports trading cards, credit card and various advertising media. It is desired for these prints to give a depth perception which can be viewed without wearing any special glasses.

One technique in the past was to prepare a lineiform image on paper. The lineiform image would be prepared by photographing a subject through a lenticular screen at different angles, superimposing the exposures on one another. The printed superimposed image would then be coated with a plastic. The plastic would be embossed with grooves registering with the lenticular screen. The registered grids of the lineiform image and embossed plastic sheet would produce a three-dimensional effect. The embossing was by a hot process, such as by using a drum which has embossing grooves formed thereon for molding the plastic sheet while hot.

For various reasons, the process described above, and other processes using embossed plastic sheets, have not been completely successful because of high cost and difficulties encountered in obtaining good uniform quality.

SUMMARY OF THE INVENTION

In this process, a lens array is formed on a clear plastic sheet using a screen printing process. The operator prepares an optic screen film having closely-spaced parallel lines. The optic screen may consist of parallel, straight, equally-spaced lines, preferably in the range of 150–300 lines per inch. A conventional silk-screen is coated with a conventional silk-screen emulsion. The silk-screen is a finely woven fabric tensioned within a conventional frame. The optic screen film is placed on the silk-screen mesh at an angle relative to the threads of the silk-screen mesh. The assembly is placed within a vacuum chamber, which has one side made of glass for exposing to light.

After sufficient vacuum has been drawn, the operator exposes light to the optic screen, which exposes the emulsion with the same pattern. The operator then develops the emulsion, and washes the unexposed portions from the screen. This results in a conventional silk-screen having a developed optic screen emulsion contained thereon.

The operator will pass a flexible, clear plastic sheet under the screen in a conventional screen printing operation. A clear polymer gel or resin is placed on the screen. The screen and a squeegee are moved relative to each other as the plastic sheet passes below. The clear resin extrudes onto the front surface of the plastic sheet opposite the printed image. The gel is then cured with ultraviolet light, forming a lens array on the plastic sheet.

For depth enhancement and special effects, the plastic sheet is previously imprinted on the back side with an image. In this process, a perception of depth can be achieved beginning with a conventional piece of printed artwork such as a conventional photograph. Using a conventional four color process scanner, an operator will separate the colors of the initial print into four primary colors. These four colors are represented on four separate negatives, each comprised of a series of dots or pixels.

The operator will make a decision as to what portions of the artwork that he wishes to add depth, and the particular desired effects that he wishes to achieve. He then will expose an optic line grid of closely spaced, parallel lines onto one or more of the negatives, depending upon which he wishes to provide depth enhancement. The optic line grid has lines that are of the same pitch and substantially parallel with the optic screen to be subsequently formed on the plastic sheet. The lines of the optic grid will be at a selected angle relative to the pixel lines on the color separation negative.

Subsequently, conventional offset printing plates will be prepared of the four color separation negatives, with the optic line grids superimposed on one or more of the plates and normally in a position such that they will be essentially vertical when viewed. The pixel lines of the different color separation negatives will be aligned at selected angles. Because of the close proximity of the optic lines, if printed on a proof paper, the lines will not normally be visible, rather the print will appear to be conventional unless viewed through magnification. The operator will offset print the image on the back side of a clear sheet of flexible plastic, such as polyvinylchloride. Then, preferably a white backing is printed over the image.

The operator subsequently screen prints the optic screen on the front side, as described above. The lines of the optic screen produced by the screen printer register with the optic line grid printed in the image in a desired manner. The optic screen screen printed on the plastic sheet comprises a large number of lenses which register with the optic grid lines in the image to provide an appearance of depth.

DETAILED DESCRIPTION OF THE INVENTION

Figure 1:
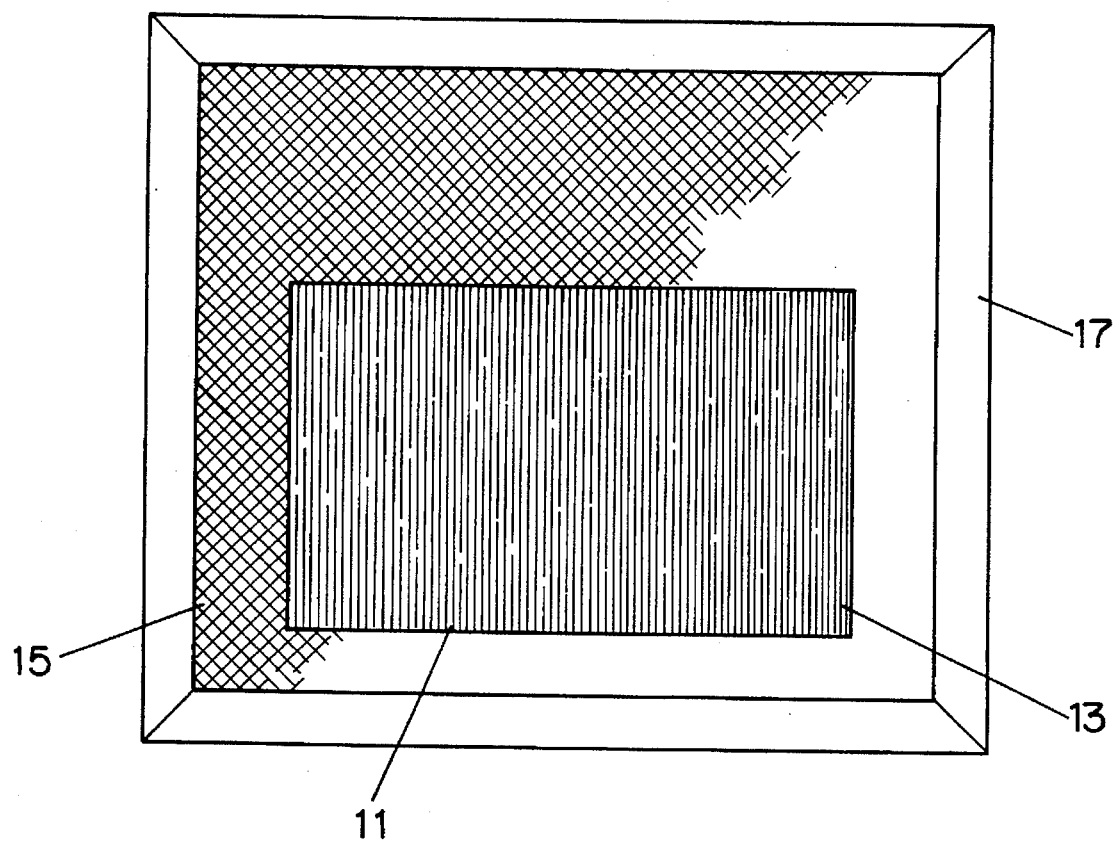
FIG. 1 shows a step in the process of this invention wherein an optic screen film is being placed on a silk-screen.

First, the description of the portion of the process dealing with printing the optic screen lens onto a plastic sheet will be described. Then a description of the process of printing the image onto the plastic sheet will be described. Referring to FIG. 1, an optic film 11 is produced by conventional photographic techniques. Film 11 will be a piece of thin, plastic film that has been formed with lines 13 to make an optic screen. In FIG. 1, lines 13 are all parallel and equidistant from each other.

Preferably there are approximately 150–300 lines per inch, and more typically 175–200 lines per inch. Lines 11 are opaque.

The optic film 11 is placed on a mesh screen 15, which may be a conventional silk-screen of high quality. As shown in FIG. 1, the optic film 11 is positioned at an angle relative to mesh screen 15 so that its lines 13 do not coincide or extend parallel with any of the threads of mesh screen 15. For example, the angle may be approximately 45 to 55 degrees. Silk-screen 15 is within a frame 17, and is tensioned conventionally such that the different portions do not exceed a tension of between 10 and 11 Newtons. Uniform tension within the region of silk-screen 15 covered by optic film 11 is desired. Mesh screen 15 will also be coated with a conventional silk-screen emulsion which is indicated by the numeral 18 in FIG. 2. The emulsion 18 will be located on the opposite side of the mesh screen 15 from optic film 11.

Figure 2:
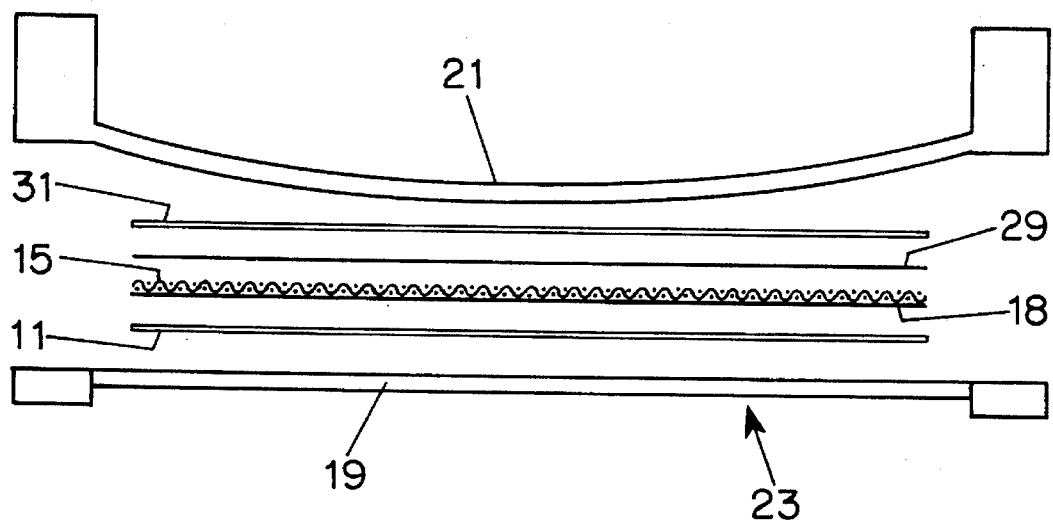
FIG. 2 shows the optic screen film and silk-screen of FIG. 1 being placed within a vacuum exposure chamber.

Referring to FIG. 2, the optic film 11 is secured in place and placed within a conventional vacuum apparatus 23 for exposing portions of emulsion 18 photographically. This apparatus 23 is a vacuum chamber that includes a clear glass 19 on one side and a rubber blanket 21 on the other side. Mesh screen 15 and optic film 11 are placed between outer rubber blanket 21 and glass 19. A red polyester film 29 will be inserted between mesh screen 15 and outer rubber blanket 21. A fine blanket 31 will be inserted between red polyester film 29 and outer blanket 21.

Figure 3:
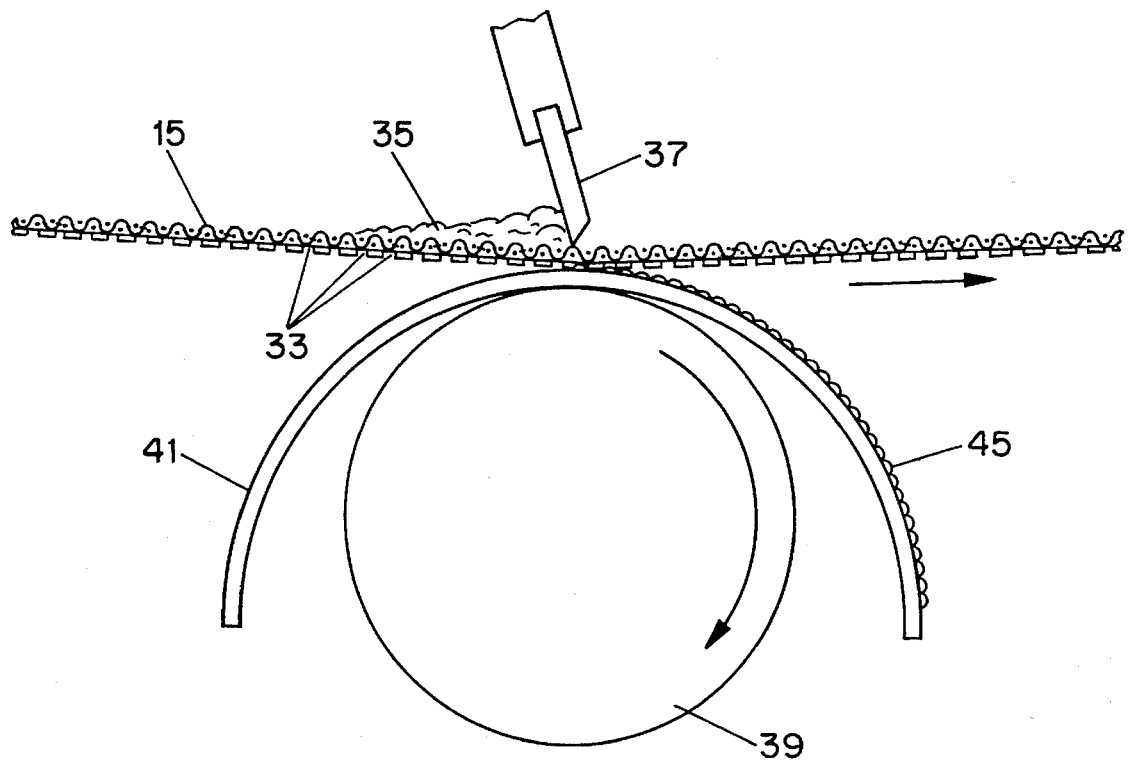
FIG. 3 schematically illustrates screen printing a clear polymer gel onto a clear plastic sheet, using the screen prepared in accordance with FIGS. 1 and 2.

Then, rubber blanket 21 will be placed in contact with the assembled components, with the outer edges of rubber blanket 21 being sealed to the outer edges of glass 19. A vacuum is drawn and held for a considerable time. The operator will watch the emulsion 18 through glass 19. An optical effect, known as Newton rings will appear. These Newton rings will gradually decrease in size as the vacuum is drawn, but in any event will take several minutes. When the Newton rings are the desired small size, the operator will then expose light to the emulsion 18. Emulsion 18 will thus be exposed in the form of optic screen 11. The operator will develop the exposed emulsion 18 conventionally, washing the non-exposed portions from mesh screen 15. This results in a mesh screen 15 having a series of finely-spaced lines 33 formed thereon, as illustrated in FIG. 3. Of course, the lines 33 are greatly exaggerated in size in FIG. 3.

Mesh screen 15 will be placed then on a conventional silk-screen printer, preferably a large high speed commercial type. Mesh screen 15 will be aligned on the printer, and a clear, viscous liquid resin 35 will be placed on the upper side of mesh screen 15. Resin 35 is a polymer gel of a conventional type such as used as a clear base for screen printing inks. The word "clear" as used in this application is used in a broader sense than transparent, and may include light color tints. Resin 35 will normally be automatically placed on the screen 15 during the process by the printer in a conventional manner. A flood bar (not shown) will typically maintain the desired level on top of mesh screen 15. Emulsion lines 33 will be located on the lower side of mesh screen 15. A squeegee 37 will be located on top of mesh screen 15, with its flexible elastomeric blade touching mesh screen 15. Conventional techniques will be used to insure a uniform desired amount of pressure of the tip of squeegee 37 against mesh screen 15.

A smooth cylinder 39 forms a part of the screen printer and is located below mesh screen 15. Cylinder 39 rotates, and has a gripping mechanism (not shown) for gripping plastic sheets 41 which will be fed from a feeder (not shown). Plastic sheet 41 is a flexible clear sheet, normally of polyvinylchloride. Sheet 41 will have on its back or lower side a printed image 43 which will be printed as explained subsequently.

The screen printer moves screen 15 back and forth in synchronizing movement with the sheets 41 pulled by rotating cylinder 39. Squeegee 37 will remain stationary during the extruding step, and will lift while screen 15 is being retracted for the next sheet 41. The resin 35 will be extruded through the mesh screen 15 and through the emulsion lines 33 onto the front side of plastic sheet 41. This results in an optic screen or lens array 45 being coated on the clear plastic sheet 41. Lens array 45 is made up of a large number of individual lenses 47 (FIG. 5), the spacing of which is exaggerated in FIGS. 3 and 5. Also, while the lenses 47 of optic screen 45 are shown running parallel with the axis of cylinder 39 in FIG. 3, they could also run perpendicular to the axis of cylinder 39 so long as the printed image 43 was printed correspondingly.

Figure 4:
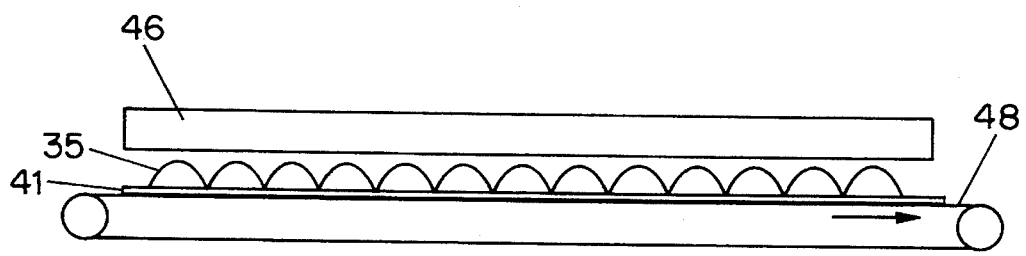
FIG. 4 shows the curing step for curing the polymer gel after imprinting as illustrated in FIG. 3.

Then, referring to FIG. 4, each sheet 41 passes onto a conveyor 48 which conveys the sheet through a cooling section (not shown) and under ultraviolet lights 46 for curing the resin 35. The resin 35 will harden or cure into the configuration of the optic screen 45 and will bond to the plastic sheet 41.

Figure 5:
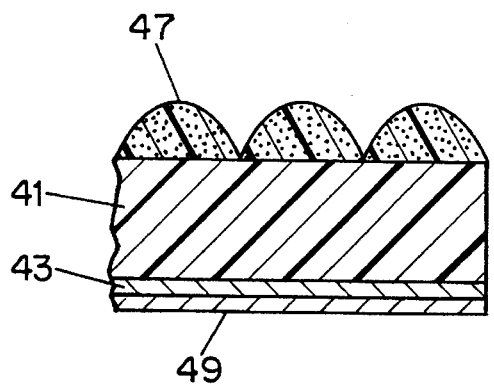
FIG. 5 is an enlarged sectional view showing a portion of the clear plastic sheet with an image printed on the back side and with an optic screen formed by the screen printing on the front side.

Referring now to FIG. 5, a cross section of a portion of sheet 41 is shown after completion. Each lens 47 is curved in transverse cross section, being convex with an outer surface in the shape of a parabola. Lenses 47 are spaced from printed image 43 by the thickness of plastic sheet 41. Preferably a white coating 49 will be printed on the back of printed image 43 to enhance reflectivity. Lenses 47 are associated with corresponding optic grid lines formed in the printed image 43 to produce an appearance of depth to an observer standing in front of optic screen 45. Preferably, there would be at least 150 to 300 lenses 47 per inch. The thickness of each lens 47 depends upon the thickness of plastic sheet 41. For example, if the thickness of plastic sheet 41 is 0.20 inch, and the number of lenses comprise 175 lines per inch, then the maximum thickness of each lens 47 is approximately 12 micrometers. Fewer lines per inch would require a thicker coating for optic screen 45. Also, a thicker plastic sheet 41 requires a thicker coating.

The printed image 43 begins with conventional two-dimensional artwork, such as a conventional color photograph or a color slide. The operator will use a conventional scanner of a type used in offset color printing to scan the image of the artwork. The associated computer and electronics of the scanner will detect the various colors in the artwork and separate these colors into the four basic colors used in offset color printing, which are magenta, cyan, black and yellow. Four negatives will be produced, one for each color, and each composed of a large number of dots, or pixels representing the particular image.

The operator will decide what portions of the artwork that he wishes to enhance dimensionally. For example, the operator may wish to provide depth enhancement to the background by leaving a portrait of an individual conventionally two dimensional. The operator may wish to add fringes of moires to the background to provide a special effect. Based on various factors, the operator will then take an optic film, similar to optic film 11 shown in FIG. 1, and expose it onto one or more of the various color negatives produced by the four color separation. Possibly, only portions of the optic film will be exposed onto the color negative. For example, perhaps only the background surrounding a silhouette of a portrait will be exposed. The optic film will have the same pitch or lines per inch as optic film 11 used in producing optic screen 45 on plastic sheet 41. The angle at which the lines of the optic film will be superimposed onto the color separation negatives relative to their pixel lines will be chosen to create the desired effect. The angle of the lines of optic film the will also be chosen to relate to or substantially register with the lines of the optic screen 45, which are generally vertical when viewed by an observer. The lines of the optic film may deliberately not be precisely parallel with lenses 47 of optic screen 45, rather may be a few degrees out of parallel alignment so as to create fringes of a moire for special effect. The slight shifting out of registry creates darker and lighter appearances, which can be beneficial in a background. Alternately, the grid lines of the optic film may be exposed on the color separation negative so as to be precisely aligned and parallel with the lenses 47 of optic screen 45. Once the operator has superimposed the desired portion of the optic line grid onto the desired number of color negatives, then the color negatives are converted into conventional offset press aluminum plates. These plates are fitted about the cylinders of a conventional offset press. Using conventional offset printing techniques, the operator will then print the four colors onto the back of plastic sheet 41, creating the printed image 43. The superimposed optic line grid in the various portions of printed image 43 is not discernable visually, unless viewed with magnification. At this point, the optic screen 45 will not yet be formed on the front side of sheet 41. The printing press may also print the white coating 49 onto the back of the plastic sheet 41.

Then, the optic screen 45 is screen printed on the front side as previously explained. The lenses 47 of optic screen 45 will be substantially vertical when the final product is viewed. The lenses 47 register with the optic line grid printed in the image 43, created an appearance of depth, and if desired, fringes of moires.

Figure 6:
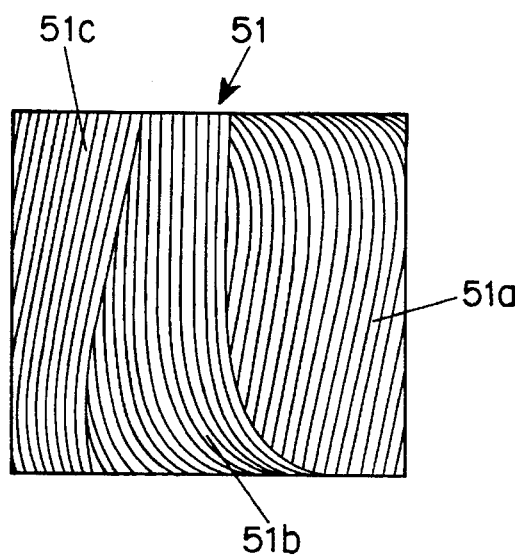
FIG. 6 illustrates an alternate embodiment of an optic screen for FIG. 1, illustrating parallel but curved lines, rather than straight lines.
Figure 7:
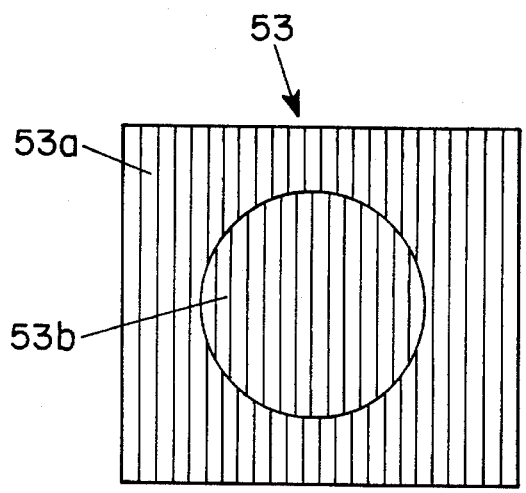
FIG. 7 illustrates a second alternate embodiment of an optic screen for use with this invention, illustrating a central portion which has optic screen lines offset from those in the background.
Figure 8:
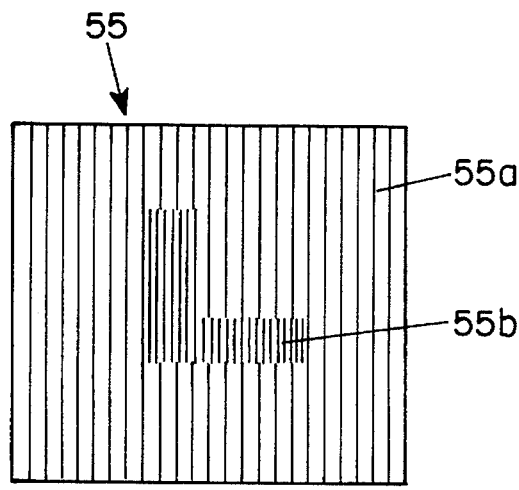
FIG. 8 is a view of a third alternate embodiment of an optic screen for use with this invention, showing a central portion which has optic screen lines at a closer spacing than those in the background.

FIGS. 6, 7 and 8 illustrate alternate embodiments for optic line film, to be used in the both in process of printing the printed image 43 as previously described and in screen printing the optic screen 45. In FIG. 6, optic film 51 has curved lines, with three curved portions 51a, 51b and 51c. Within each group, the lines are parallel. The group of lines in the sets 51a, 51b and 51c are not parallel to each other.

In FIG. 7, optic film 53 has a conventional background 53a of straight vertical lines and a central portion 53b that is encircled. Central portion 53b has the same pitch or spacing between lines, but is offset slightly to create a special effect.

In FIG. 8, optic film 55 has a conventional background 55a of straight parallel vertical lines. The central portion 55b has straight lines in the shape of an "L". The pitch of the lines of central portion 55b is much 21 smaller than the pitch of the lines of background 55a.

The invention has significant advantages. The process of forming the optic screen or lens by using a screen printing process allows high quality, inexpensive products to be produced with a depth-enhanced effect. The screen printing operation is high speed and more economical than prior art embossing processes. Registry of the screen with the plastic sheet is handled conventionally and easily. By using exposed optic screen lines formed in an emulsion on a screen, rather than embossing, the lines can be other than straight and parallel. Some of the lines may curve, others may have a different pitch or be offset or enhanced. The superimposition of the same optic screen lines onto one or more of the four color printing negatives is inexpensive and lends itself to high speed operations. It allows depth enhancement of conventional two-dimensional artwork and photographs, without the need to create three-dimensional photographs by superimposing negatives taken at different angles of the same object.

While the invention has been shown in only a few of its forms, it should be apparent to those skilled in the art that it is not so limited, but is susceptible to various changes without departing from the scope of the invention.

I claim:

1. A method of forming an optic screen on a clear plastic sheet, comprising:

forming an optic array of lines on a porous mesh screen; then placing a clear gel onto the mesh screen and placing the plastic sheet below the mesh screen;

extruding the gel through the mesh screen onto the plastic sheet to coat the gel on the image sheet in the form of the optic array; then curing the gel such that the optic array forms a plurality of lenses.

2. The method according to claim 1 wherein the step of forming the optic array of lines comprises:

forming the optic array on photographic film;

coating the mesh screen with a light sensitive emulsion; then placing the film adjacent the mesh screen; then passing light through the film to expose the optic array onto the emulsion; and removing portions of the emulsion which were not exposed to the light, leaving a cured emulsion of the optic array on the mesh screen.

3. The method according to claim 1 wherein the step of forming the optic array of lines comprises:

forming the optic array on photographic film;

coating the mesh screen with a light sensitive emulsion; then placing the film adjacent the mesh screen; then placing the film and mesh screen within a vacuum chamber and evacuating any spaces between the film and mesh screen; then passing light through the film to expose the optic array onto the emulsion; and removing portions of the emulsion which were not exposed to the light, leaving a cured emulsion of the optic array on the mesh screen.

4. The method according to claim 1 wherein the step of forming the optic array of lines comprises:

forming the optic array on photographic film;

coating the mesh screen with a light sensitive emulsion; then placing the film adjacent the mesh screen in an orientation such that none of the lines of the optic array are parallel with any threads of the mesh screen; then passing light through the film to expose the optic array onto the emulsion; and removing portions of the emulsion which were not exposed to the light, leaving a cured emulsion of the optic array on the mesh screen.

5. The method according to claim 1 wherein the step of forming the optic array of lines comprises:

forming the optic array on photographic film;

coating the mesh screen with a light sensitive emulsion; then placing the film adjacent the mesh screen in an orientation such that none of the lines of the optic array are parallel with any threads of the mesh screen; then placing the film and mesh screen within a vacuum chamber and evacuating any spaces between the film and mesh screen; then passing light through the film to expose the optic array onto the emulsion; and removing portions of the emulsion which were not exposed to the light, leaving a cured emulsion of the optic array on the mesh screen.

6. The method according to claim 1 wherein the step of forming the optic array of lines comprises forming all of the lines straight, parallel to and equally spaced from each other.

7. The method according to claim 1 wherein the step of forming the optic array of lines comprises forming a first portion of the lines parallel to and equally spaced from each other, and a second portion of the lines parallel to and equally spaced from each other but not parallel to the lines of the first portion.

8. The method according to claim 1 wherein the step of forming the optic array of lines comprises forming a first portion of the lines parallel to and equally spaced from each other, and a second portion of the lines parallel to and equally spaced from each other but more closely spaced from each other than the lines of the first portion.

9. The method according to claim 1 wherein the step of forming the optic array of lines comprises forming a first portion of the lines curved, parallel to and equally spaced from each other, and a second portion of the lines curved, parallel to and equally spaced from each other but not parallel to the lines of the first portion.

10. The method according to claim 1 wherein the steps of placing the plastic sheet below the mesh screen and extruding the gel through the mesh screen comprise:

placing a squeegee on the mesh screen;

placing a cylinder below the mesh screen;

rotating the cylinder and feeding the plastic sheet between the cylinder and the mesh screen; and moving the mesh screen linearly while holding the squeegee stationary so that the optic array is printed onto the sheet as the sheet and mesh screen move.

11. The method according to claim 1, wherein the viscosity and cure rate of the gel are selected so that each line of the optic array when cured has a curved transverse cross section configuration.

12. The method according to claim 1 wherein the step of curing the gel comprises exposing the plastic sheet coated with the gel to ultraviolet light.

13. A method of forming a depth enhanced print product, comprising:

forming an optic array of lines in the form of a cured emulsion on a porous mesh screen;

printing an image on the back side of a clear plastic sheet, at least a portion of which is provided with an optic line grid which relates to the optic array;

placing a clear polymer gel onto the mesh screen and placing the plastic sheet below the mesh screen;

extruding the gel through the screen onto a front side of the plastic sheet to coat the gel on the plastic sheet in the form of the optic array; then curing the gel, with the optic line grid in the printed image relating to the optic array to provide depth enhancement.

14. The method according to claim 13, wherein the step of printing the image on the back side of a plastic sheet comprises:

providing a print of artwork;

separating colors of the artwork into color separation negatives;

superimposing the optic line grid onto at least a portion of at least one of the color separation negatives; then making offset printing plates from the color separation negatives; and offset printing the image onto the back side of the plastic sheet.

15. The method according to claim 13 wherein the step of forming the optic array of lines comprises:

forming the optic array on photographic film;

coating the mesh screen with a light sensitive emulsion; then placing the film adjacent the mesh screen in an orientation such that none of the lines of the optic array are parallel with any threads of the mesh screen; then placing the film and mesh screen within a vacuum chamber and evacuating any spaces between the film and mesh screen; then passing light through the film to expose the optic array onto the emulsion; and removing portions of the emulsion which were not exposed to the light, leaving a cured emulsion of the optic array on the mesh screen.

16. The method according to claim 13 wherein the steps of placing the plastic sheet below the mesh screen and extruding the gel through the mesh screen comprise:

placing a squeegee on the mesh screen;

placing a cylinder below the mesh screen;

rotating the cylinder and feeding the plastic sheet between the cylinder and the mesh screen; and moving the mesh screen linearly while holding the squeegee stationary so that the optic array is printed onto the sheet as the sheet and mesh screen move.

17. The method according to claim 13, wherein the viscosity and cure rate of the gel are selected so that each line of the optic array when cured has a curved transverse cross section configuration.

18. A method of forming a depth enhanced print product, comprising:

providing a print of artwork;

separating colors of the artwork into color separation negatives;

superimposing an optic line grid onto at least a portion of at least one of the color separation negatives; then making offset printing plates from the color separation negatives;

offset printing an image from the printing plates onto the back side of a clear plastic sheet;

forming on photographic film an optic array of lines which have a relationship with the optic line grid;

coating a mesh screen with a light sensitive emulsion; then placing the film adjacent the mesh screen in an orientation such that none of the lines of the optic array are parallel with any threads of the mesh screen; then placing the film and mesh screen within a vacuum chamber and evacuating any spaces between the film and mesh screen; then passing light through the film to expose the optic array onto the emulsion; and removing portions of the emulsion which were not exposed to the light, leaving a cured emulsion of the optic array on the mesh screen; then placing a clear polymer gel onto an upper side of the mesh screen and placing the plastic sheet with its front side in contact with a lower side of the mesh screen;

mounting a squeegee in contact with the upper side of the mesh screen;

moving the squeegee and the screen relative to each other to force the gel through the screen onto the plastic sheet to coat the front side of the plastic sheet with a clear coating in the form of the optic array; then curing the gel to form lenses in the optic array which substantially register with the lines of the optic line grid to provide an enhanced depth.

19. The method according to claim 18 wherein the steps of placing the plastic sheet with its front side in contact with the lower side of the mesh screen and forcing the gel through the mesh screen with the squeegee comprise:

placing a cylinder below the mesh screen;

rotating the cylinder and feeding the plastic sheet between the cylinder and the mesh screen; and moving the mesh screen linearly while holding the squeegee stationary so that the optic array is printed onto the plastic sheet as the plastic sheet and mesh screen move.

20. The method according to claim 18, wherein the step of forming on photographic film an optic array of lines comprises spacing the lines in the range from 150 to 300 lines per inch.

* * * * *